UNITED STATES PATENT OFFICE.

HENRY HOWARD, OF BOSTON, MASSACHUSETTS.

METHOD OF OXIDIZING ATMOSPHERIC NITROGEN.

952,248. Specification of Letters Patent. Patented Mar. 15, 1910.

No Drawing. Application filed June 10, 1907. Serial No. 378,299.

*To all whom it may concern:*

Be it known that I, HENRY HOWARD, a citizen of the United States, residing at Boston, in the county of Suffolk and State of Massachusetts, have invented certain new and useful Improvements in Methods of Oxidizing Atmospheric Nitrogen, of which the following is a specification.

The object of this invention is to provide an effective method of oxidizing atmospheric nitrogen and recovering the oxidized product with minimum loss by dissociation.

It is well known that the conditions for the effective oxidation of atmospheric nitrogen and recovery of the product are; (1) subjecting the nitrogen mixed with the proper proportion of oxygen to an extremely high temperature, as that of the electric discharge or arc, under which conditions the oxidation occurs; and (2) cooling the oxidized products in such manner as to carry them rapidly through the zone of moderate temperature favorable to dissociation. Many efforts have been made to attain these conditions, the cooling being effected either by permitting the gas to expand into cooled chambers or by passing it over cooled surfaces.

The present invention contemplates a more rapid cooling of the oxidized gas than is practicable by either of these methods, and consists in the provision of conditions whereby heat-energy of the gas is transformed into mechanical work. Under such conditions the cooling is extremely rapid and the loss by dissociation correspondingly small.

According to my invention air or a gas containing nitrogen and oxygen is compressed, and is then subjected to the action of an electric arc which causes a great increase in pressure; it is then allowed to expand while doing sufficient work to absorb as much as practicable of its heat-energy, whereby extremely rapid cooling is secured; this cycle is then repeated. The character of the work done by the gas during its expansion is obviously immaterial in so far as the cooling effect is concerned, it being essential only that a sufficient proportion of the total heat-energy of the gas should be transformed into work to accomplish the desired cooling.

In practice the energy of the expanding gas will preferably be utilized for useful purposes, as for generating a portion of the electrical energy required for heating the gas, effecting a corresponding saving in the outside power required. The principle may be applied in various ways, as for instance in a machine operating on the principle of an internal combustion engine, either of the four-cycle or two-cycle type. In the former case the first stroke of the piston serves to draw the gaseous mixture into the cylinder, and the second to compress it therein; at about the moment of maximum compression or shortly before it is subjected to the heating effect of a powerful electric arc whereby its pressure is greatly increased. During the following or power stroke the heat-energy of the expanding gas is converted to a large extent into mechanical work with coincident chilling of the gas, further quantities of heat being dissipated by other means if desired. The final stroke of the cycle ejects the oxidized gas. In the two-cycle type the operation proceeds as above except that the oxidized products are ejected and the fresh mixture admitted in the course of a single stroke. The principle may also be applied in a continuous manner by first compressing the gaseous mixture, and then passing it through a combustion chamber wherein it is strongly heated by a continuous or substantially continuous arc discharge, thereby increasing the volume of the mixture; the hot gases are then allowed to expand and do work as for instance by passing them through a turbine, the condition for the effective accomplishment of the reaction being that the expansion of the entire body of highly-heated oxidized product shall follow the reaction so closely as to effect so rapid cooling as to minimize the dissociation thereof.

I claim:

The method of oxidizing nitrogen, which consists in compressing a gaseous mixture containing nitrogen and oxygen, subjecting the same in the compressed state to an electric discharge, then immediately expanding the entire body of highly-heated oxidized product and converting the heat energy into mechanical work, whereby a rapid cooling of the oxidized product is secured and the dissociation of the same is minimized.

In testimony whereof, I affix my signature in presence of two witnesses.

HENRY HOWARD.

Witnesses:
W. F. OBURG,
W. B. KEITH.